US009003882B1

(12) United States Patent  (10) Patent No.: US 9,003,882 B1
Ayazi et al.  (45) Date of Patent: Apr. 14, 2015

(54) VIBRATORY TUNING FORK BASED SIX-DEGREES OF FREEDOM INERTIAL MEASUREMENT MEMS DEVICE

(75) Inventors: Farrokh Ayazi, Atlanta, GA (US); Divyanshu Agrawal, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 213 days.

(21) Appl. No.: 13/288,744

(22) Filed: Nov. 3, 2011

Related U.S. Application Data

(60) Provisional application No. 61/409,729, filed on Nov. 3, 2010.

(51) Int. Cl.
*G01C 19/56* (2012.01)
*G01P 15/125* (2006.01)
*G01P 15/18* (2013.01)

(52) U.S. Cl.
CPC ..................................... *G01C 19/56* (2013.01)

(58) Field of Classification Search
USPC ............... 73/504.12, 504.14, 504.16, 504.04, 73/514.32, 514.38, 510, 511, 504.03
See application file for complete search history.

(56) References Cited

U.S. PATENT DOCUMENTS

| | | | | |
|---|---|---|---|---|
| 8,096,181 B2 * | 1/2012 | Fukumoto | ................... | 73/504.12 |
| 8,201,449 B2 * | 6/2012 | Ohuchi et al. | ............ | 73/504.12 |
| 8,256,290 B2 * | 9/2012 | Mao | ........................... | 73/504.12 |
| 8,272,267 B2 * | 9/2012 | Tamura et al. | ............. | 73/504.12 |
| 8,347,717 B2 * | 1/2013 | Seeger et al. | ............. | 73/504.12 |
| 8,413,506 B2 * | 4/2013 | Coronato et al. | .......... | 73/504.12 |
| 8,459,109 B2 * | 6/2013 | Caminada et al. | ......... | 73/504.12 |
| 8,459,110 B2 * | 6/2013 | Cazzaniga et al. | ......... | 73/504.12 |
| 2006/0112764 A1 * | 6/2006 | Higuchi | ..................... | 73/504.12 |
| 2007/0062282 A1 * | 3/2007 | Akashi et al. | ............. | 73/504.12 |
| 2009/0126490 A1 * | 5/2009 | Sameshima | ................ | 73/514.32 |
| 2010/0126270 A1 * | 5/2010 | Terada et al. | ............. | 73/504.12 |
| 2011/0030473 A1 * | 2/2011 | Acar | ......................... | 73/504.12 |

* cited by examiner

*Primary Examiner* — Helen Kwok
(74) *Attorney, Agent, or Firm* — Burns & Levinson LLP; Bruce D. Jobse, Esq.

(57) ABSTRACT

A high-Q, mode-matched, vibratory tuning fork based MEMS device, capable of sensing rotational and translational motion around three axes, and processes of fabrication are disclosed herein. In one embodiment, a MEMS device has first and second proof masses actuated along a first axis, and a third and fourth proof masses actuated along a second orthogonal axis. Each of the proof masses includes an inner mass mechanically coupled to an outer frame. A plurality of electrodes sense rotational or translational motion along the three orthogonal axes.

19 Claims, 15 Drawing Sheets

VIBRATORY TUNING FORK BASED SIX-DEGREES OF FREEDOM INERTIAL MEASUREMENT MEMS DEVICE

BACKGROUND OF THE INVENTION

Inertial measurement devices, such as gyroscopes and accelerometers, can be classified into three main categories: mechanical, optical, and MEMS devices. Mechanical and optical inertial devices provide high-precision, but their cost, size, and power requirements limit their usage in a wider range of industries such as consumer products, gaming devices, automobile, and handheld positioning systems.

MEMS gyroscopes and accelerometers have been gaining a lot of attention from industry. Micro-machining technologies have made fabrication of miniature gyroscopes possible, thus catering to a broader market. Miniaturization also enables integration with readout electronics on the same die, resulting in reduced size, cost, and power consumption as well as improved resolution by reducing noise. Consumer products such as digital cameras, 3D gaming equipment, and automotive sensors are employing MEMS devices because of their numerous advantages. The demand for low cost, more sophisticated, and user-friendly devices by the consumers has caused a steep rise in the demand of MEMS sensors, as they offer adequate reliability and performance at very low prices.

State-of-the-art MEMS devices are able to sense rotational and translational motion separately around and along one or two axes but are not capable of sensing rotational and translational motion simultaneously around all three axes. Accordingly, there is a need for MEMS device solutions that are capable of sensing rotational (i.e. angle or angular velocity of rotation around an axis) and translational motion (i.e. linear acceleration along an axis) around and along three axes.

SUMMARY OF THE INVENTION

Technologies are described herein for MEMS device solutions that are capable of sensing rotational and translational motion around and along all three axes of free space. In particular, a high-Q, mode-matched, vibratory tuning fork based MEMS device capable of sensing rotational (i.e. angle or angular velocity of rotation) and translational motion (linear acceleration), around and along three axes of free space and processes of fabrication are disclosed herein.

In one embodiment, the MEMS device comprises four proof masses that are designed to measure the motion in all six degrees of freedom. In particular, the MEMS device comprises a first proof mass and a second proof mass actuated along a first axis, and a third proof mass and a fourth proof mass actuated along a second orthogonal axis. Each of the proof masses includes an inner mass mechanically coupled to an outer frame. The MEMS device also includes a plurality of electrodes capable of sensing at least one of rotational or translational motion along at least one of three orthogonal axes.

In another embodiment, a method of fabricating a MEMS device comprises providing a silicon-on-insulator (SOI) wafer comprising a handle layer and a device layer separated by an oxide layer, depositing a nitride layer on the device layer, and patterning the nitride layer. The method further comprises patterning the device layer of the SOI wafer, depositing a sacrificial oxide layer on the patterned nitride layer and the patterned device layer, patterning the sacrificial oxide layer, depositing a polysilicon layer on the sacrificial oxide layer that is on the patterned nitride layer and the patterned device layer, patterning the polysilicon layer, and releasing the device. The SOI wafer may have a built-in cavity underneath the proof masses to facilitate the release of the device.

In yet another embodiment, a method of fabricating a MEMS device comprises providing a SOI wafer comprising a handle layer and a device layer separated by an oxide layer, patterning the handle layer to form bottom electrodes, and isolating the bottom electrodes from the handle layer. The device layer is then patterned and a sacrificial oxide layer is deposited on the patterned device layer. The sacrificial oxide layer is then patterned, and a polysilicon layer is deposited on the sacrificial oxide layer. The polysilicon layer is then patterned and the device is released.

BRIEF DESCRIPTION OF THE DRAWINGS

The present disclosure is illustratively shown and described in reference to the accompanying drawing in which.

DETAILED DESCRIPTION

Technologies herein are directed towards sensing rotation and acceleration around all three axes of free space using an inertial measurement MEMS device. Such devices will have to have at least six degrees of freedom in their mechanical design to be able to sense six independent motion signals, i.e.

linear acceleration along and angular velocity signals around three orthogonal axes of free space. In particular, the mechanism for sensing rotation rate is similar to a mode-matched vibratory tuning fork gyroscope in that the proof masses of the inertial measurement MEMS device each vibrate along a single axis (known as the drive mode) and if the MEMS device experiences rotation along another axis, the proof masses start vibrating along a third axis (known as the sense mode) due to the Coriolis force. Under mode-matched condition, the sense mode is designed to have the same, or nearly the same, resonance frequency as the drive mode. Hence, the rotation induced Coriolis signal is amplified by the mechanical quality factor (Q) of the sense mode, which can be high, in the range of 100 to 1,000,000. These vibrations are directly proportional to the rotation rate and can be capacitively sensed. In this way, inertial measurement MEMS devices can be simplified in terms of complexity and readout electronics while also reducing the size, cost and power requirements.

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

Figure 1:
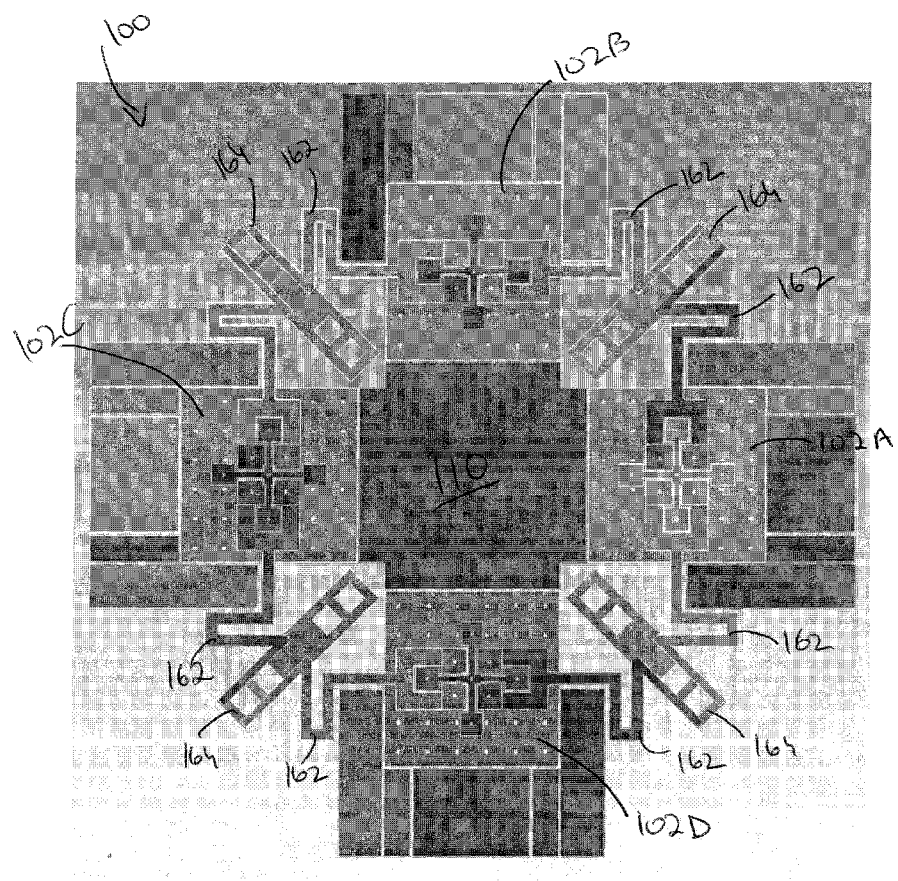
FIG. 1 illustrates a top view of a inertial measurement device according to various embodiments of the present disclosure.
Figure 2:
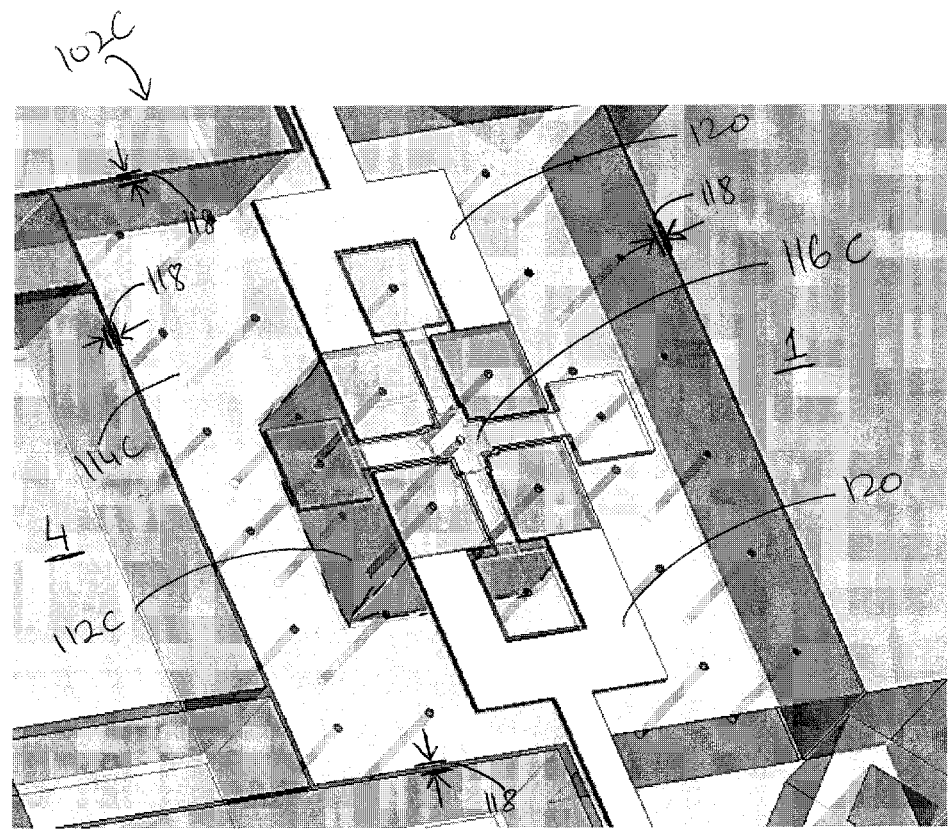
FIG. 2 illustrates a top view of a proof mass of the device shown in FIG. 1 according to various embodiments of the present disclosure.
Figure 3:
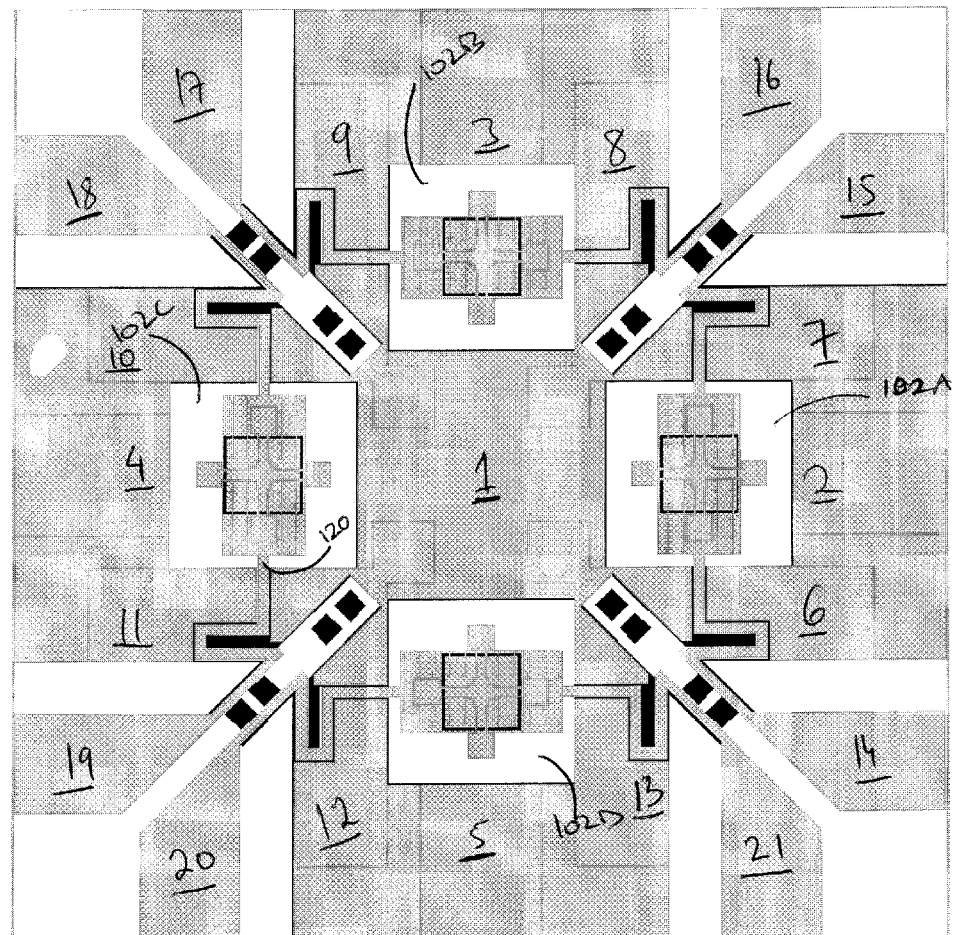
FIG. 3 illustrates a perspective view of an electrode arrangement associated with the device according to various embodiments of the present disclosure.

Referring now to FIGS. 1, 2 and 3, various views of an inertial measurement MEMS device 100 are shown according to various embodiments of the present disclosure. The device 100 includes four proof masses 102A-D, generally referred to hereinafter as 102. A first pair of proof masses 102A and 102C are actuated along a first axis, and a second pair of proof masses 102B and 102D are actuated along a second axis orthogonal to the first axis. Assuming the in-plane axes as x and y, and the out-of-plane axis as z, the first pair of proof masses 102A and 102C are actuated along the x-axis, and the second pair of proof masses 102B and 102D are actuated along the y-axis at their resonance frequency. In various embodiments, each of the proof masses 102 may be actuated by a central comb drive 110, or parallel plate capacitive transducers, or piezoelectric transducers that include thin film of piezoelectric material like AlN, ZnO, or PZT on silicon. Each of the proof masses 102 are separated from sense electrodes positioned along the sides of the proof masses by capacitive gaps 118, some of which are shown in FIG. 2. As the proof masses 102 resonate, the size of the capacitive gap changes, allowing the sense electrodes to sense the movement of the proof masses 102. The drive output signal is sensed from outer comb drives and amplified using integrated circuitry, and fed back to the central comb drive 110. Thus, the drive loop can act as an oscillator resonating at the drive resonance frequency.

Each of the proof masses 102A-D may include a corresponding inner mass 112A-D, generally referred to hereinafter as inner mass 112, and a corresponding outer frame 114A-D, generally referred to hereinafter as outer frame 114. Each inner mass 112 may be coupled to the corresponding outer frame 114 by at least one tether 116. In various embodiments, the tethers 116 can be made from polysilicon, or any other suitable material that couples the inner mass 112 to the outer frame 114, while allowing the inner mass 112 to move relative to the outer frame 114. It should further be appreciated that the tether 116 can be made from a different structural layer than the inner mass. In some embodiments, the tethers 116 may cause the in-plane mode and the out-of-plane mode to have similar, if not identical, resonant frequencies. In various embodiments, the inner mass 112 and the outer frame 114 of the proof mass 102 may be anchored on the outer frame 114 and the inner mass 112 in a '+' shaped configuration. By coupling the inner mass 112 to a corresponding outer frame 114, the inner mass 112 can become compliant along a third orthogonal axis, such as the z-axis. Through careful and appropriate design of tether 116C for example, by choosing the right thickness for the tether and appropriately sizing its lateral dimensions, the in-plane drive mode and out-of-plane sense mode can have similar resonance frequencies. With particular reference to FIG. 2, the proof mass 102C is shown to include an inner mass 112C coupled to the outer frame 114C via the tethers 116C. It should be understood that the other proof masses 102A, B and D have a structure similar to the proof mass 102C shown in FIG. 2.

The inner masses 112 can vibrate with the outer frame 114 at the resonance frequency of the drive mode. When the device 100 is rotated around the z-axis, the four proof masses 102 may begin to vibrate along the in-plane axis perpendicular to the axis along which they were actuated. The rotation rate information can be capacitively sensed and extracted from these vibrations. Similarly, if the device 100 is rotated around either the x- or y-axis, the inner masses 112 will start vibrating along the z-axis. As the proof masses 102 opposite to each other are vibrating out of phase, the corresponding Coriolis-induced effect exhibits a similar anti-phase characteristic which helps reject common-mode false signals. As a result, linear acceleration is rejected as a common-mode signal without the need for complex electronics. An out of plane resonance frequency of the inner mass 112 and the tethers 116 attached directly to it can be equal or nearly equal to the in-plane resonance frequency of the corresponding host proof mass 102, such that rotation around the corresponding in-plane axis is sensed at the resonance frequency of the inner mass 112 and the tethers 116 attached directly to it.

Still referring to FIGS. 1, 2 and 3, the device 100 also includes fish-hook shaped tethers 162 that help in obtaining compliance in both in-plane axes, thus giving similar resonating frequency. These fish-hook shaped tethers 162 are coupled to a corresponding outer frame 114 on one end, and to a corresponding ladder-shaped anchor 164 on another end. The ladder-shaped anchors 164 at the corners provide mechanical coupling, which allows synchronization of the phases of the proof masses 102 even in the presence of minor fabrication imperfections. Another important function enabled by the ladder-shaped anchors 164 is the isolation of the operating mode from the two other existing pseudo-modes.

The device 100 also includes a plurality of sense electrodes, including side electrodes, labeled 1-13 and a plurality of top electrodes labeled 14-21 as shown in FIG. 3. Each of the top electrodes 14-21 may include a sensing portion 116 that may be anchored to the outer frame 114 and may sense the vibrations along the z-axis. In various embodiments, the sensing portion 120 may be mounted on the outer frames 114 of the proof masses 102 in such a manner that the sensing portion 120 extends over the inner mass 112. In this way, as the inner mass 112 moves relative to the z-axis, the top electrodes are able to sense the movement of the inner mass 112 relative to the outer frame 114 and provide a signal corresponding to the sensed movement to the corresponding top electrode. The proper addition or subtraction of signals sensed from top electrodes 120 is necessary to sense acceleration along the three axes. Thus, retrieving the output from each top electrode 120 separately is important, which may result in some complexity in the interface circuits. Further-more, the side electrodes 1-13 are separated from a corresponding outer frame 114 by a lateral capacitive gap, as can be seen between the electrode 4 and the outer frame 114C. Additional details regarding the electrodes will be described below with respect to FIG. 3.

Referring now specifically to FIG. 3, a perspective view of an electrode arrangement associated with the device 100 is shown. For ease of reference, each of the electrodes has been assigned a numerical reference value as shown in FIG. 3. The following equations illustrate how rotation and acceleration along all three axes can be measured:

Central drive electrode: 1
Drive-out electrode arrangement: (2+3+4+5)
Electrode arrangement to sense rotation around z axis: (7+9+11+13)−(6+8+10+12)
Electrode arrangement to sense rotation around x axis: (14+15)−(18+19)
Electrode arrangement to sense rotation around y axis: (20+21)−(16+17)
Electrode arrangement to sense acceleration along z axis: (14+15+16+17+18+19+20+21)
Electrode arrangement to sense acceleration along x axis: (14+19)−(15+18)
Electrode arrangement to sense acceleration along y axis: (16+21)−(17+20)

As mentioned above, the architecture may utilize a comb-drive for drive mode excitation to minimize the effect of polarization voltage on the spring softening of drive mode. In addition, the architecture may utilize a parallel plate capacitor for sense mode detection. Due to the nature of these two types of transducers, applying a polarization voltage will keep drive mode frequency constant and cause the sense mode frequency to shift downwards. This enables tuning of the sense mode to match the drive mode frequency.

Although the present disclosure describes embodiments of the proof masses being made from Silicon, it should be appreciated that other materials, including but not limited to, silicon carbide, diamond, silicon dioxide, or fused silica may also be used to fabricate the proof masses disclosed herein.

Figure 4:
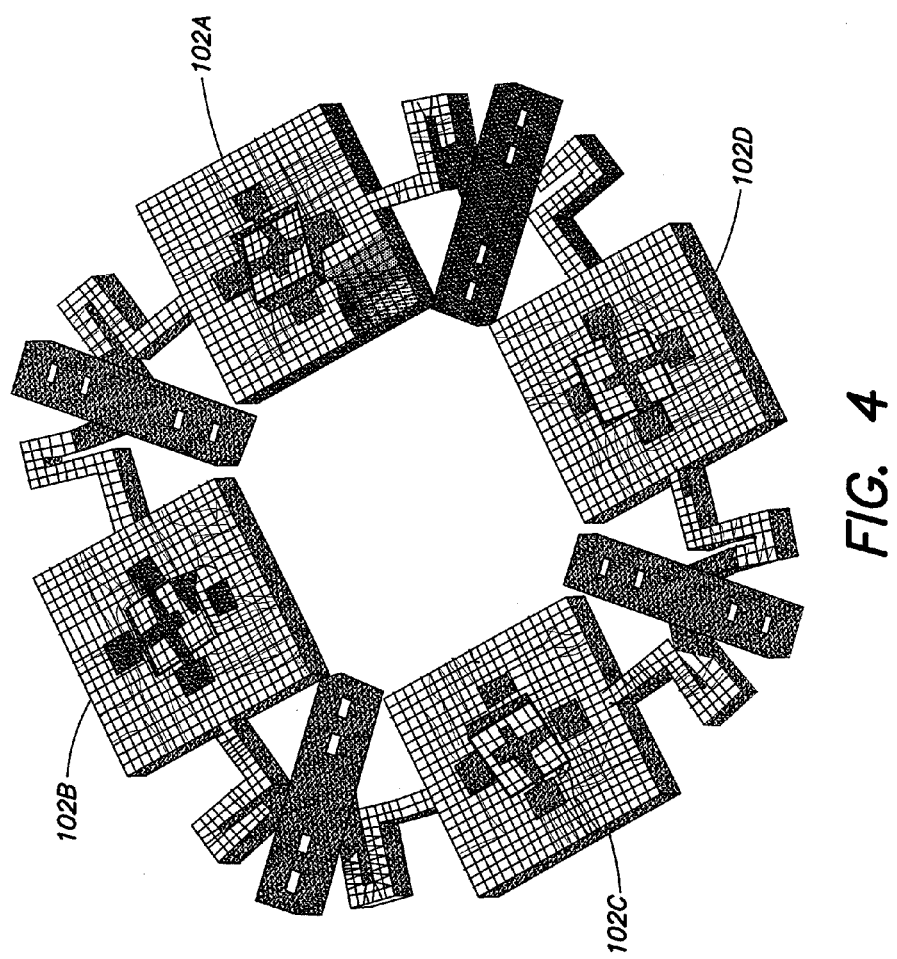
FIG. 4 illustrates an ANSYS simulation model of a drive mode according to various embodiments of the present disclosure.
Figure 5:
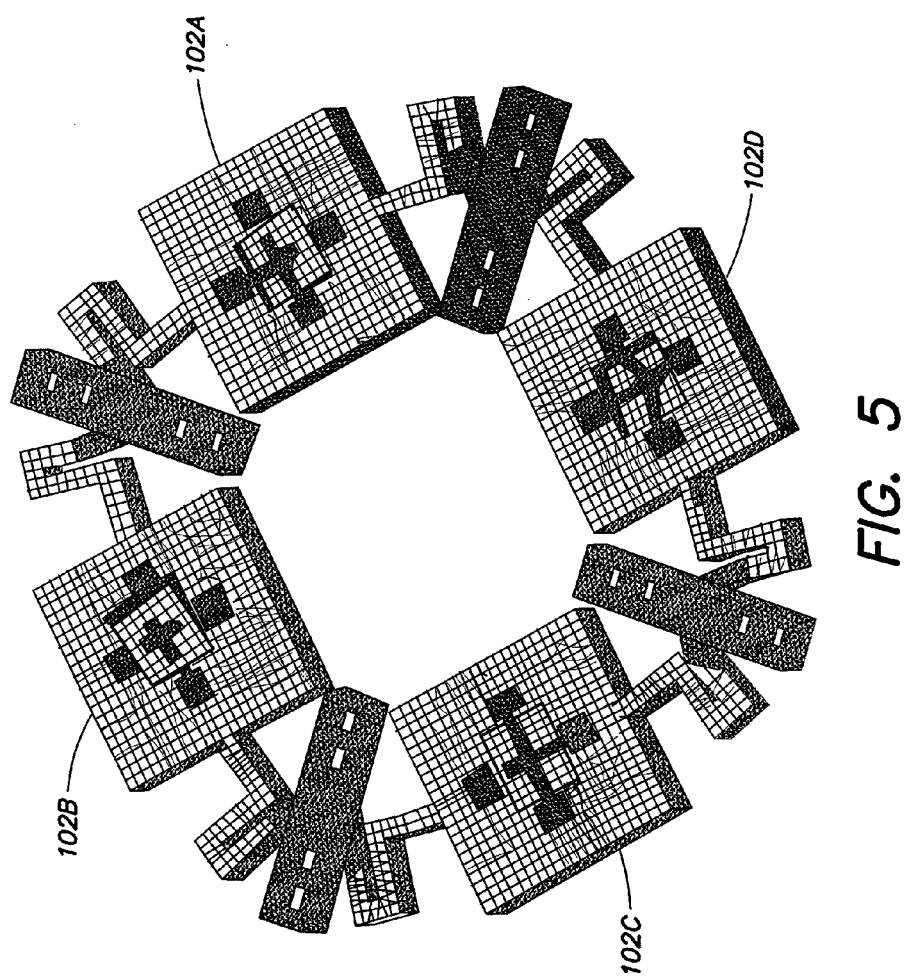
FIG. 5 illustrates an ANSYS simulation model of a sense mode for sensing rotations around the z-axis according to various embodiments of the present disclosure.
Figure 6A:
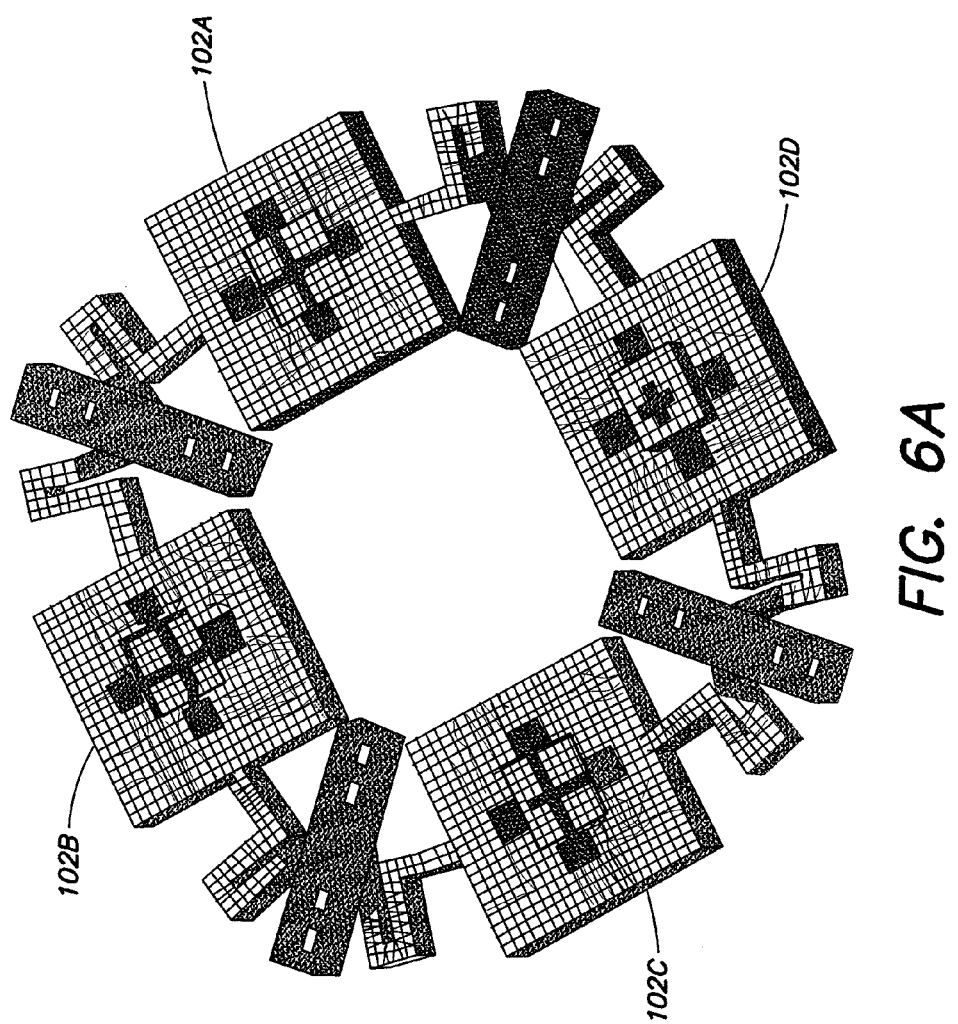
FIGS. 6A and 6B illustrate ANSYS simulation models of a sense mode for sensing rotations around the x and y axes according to various embodiments of the present disclosure.
Figure 6B:
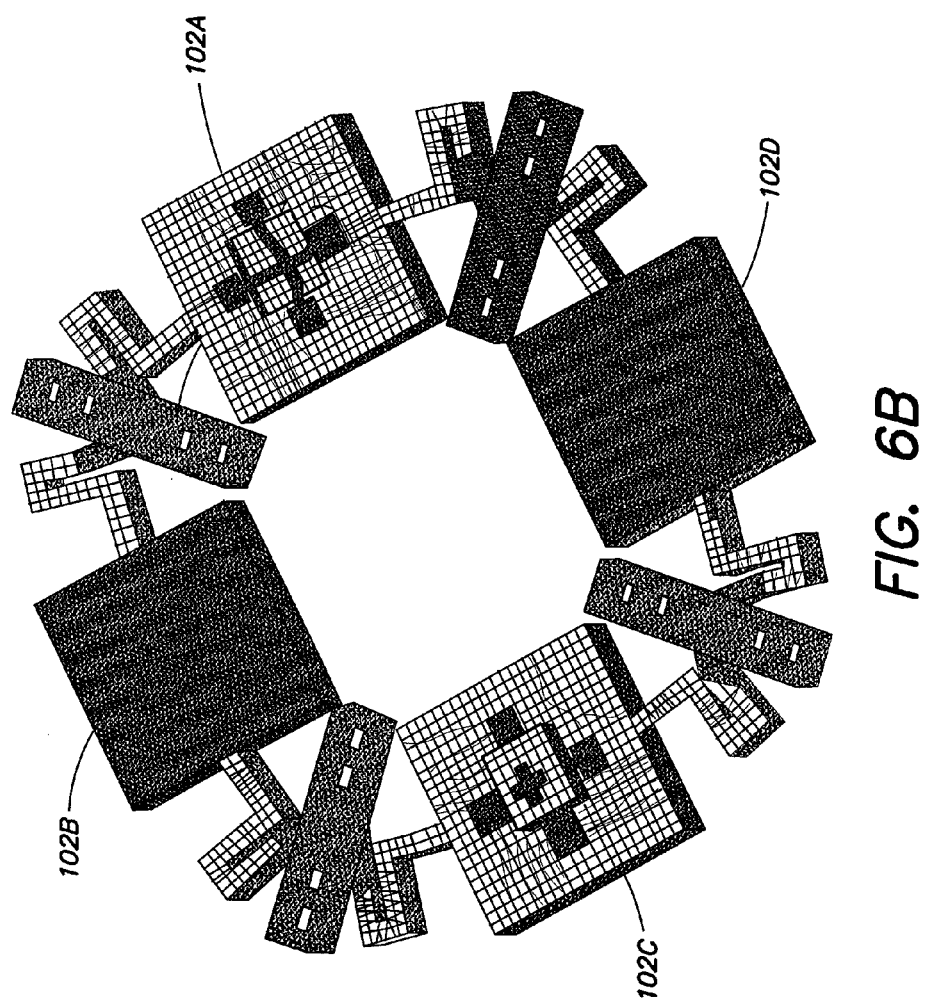

FIG. 4 illustrates an ANSYS simulation model of a drive mode, where the proof mass 102A and 102C are resonating along the first axis and proof mass 102B and 102D are resonating along the second axis. FIG. 5 illustrates an ANSYS simulation model of a sense mode for sensing rotations around the z-axis, where the proof mass 102A and 102C are resonating along the second axis and proof mass 102B and 102D are resonating along the first axis. FIG. 6A illustrates ANSYS simulation models of a sense mode for sensing rotations around the x axis, where the proof mass 102B and 102D are resonating along the third axis with inner mass 112 out of phase with outer frame 114. FIG. 6B illustrates ANSYS simulation models of a sense mode for sensing rotations around the y axis, where the proof mass 102A and 102C are resonating along the third axis with inner mass 112 out of phase with outer frame 114, according to various embodiments of the present disclosure. During operation, the drive mode is excited into resonance by the central comb-drive. Upon rotation along any axis, the corresponding sense mode will be excited and sensed capacitively. Signals from the electrodes will be processed as described above to extract the motion information at all six degrees of freedom.

Figure 7:
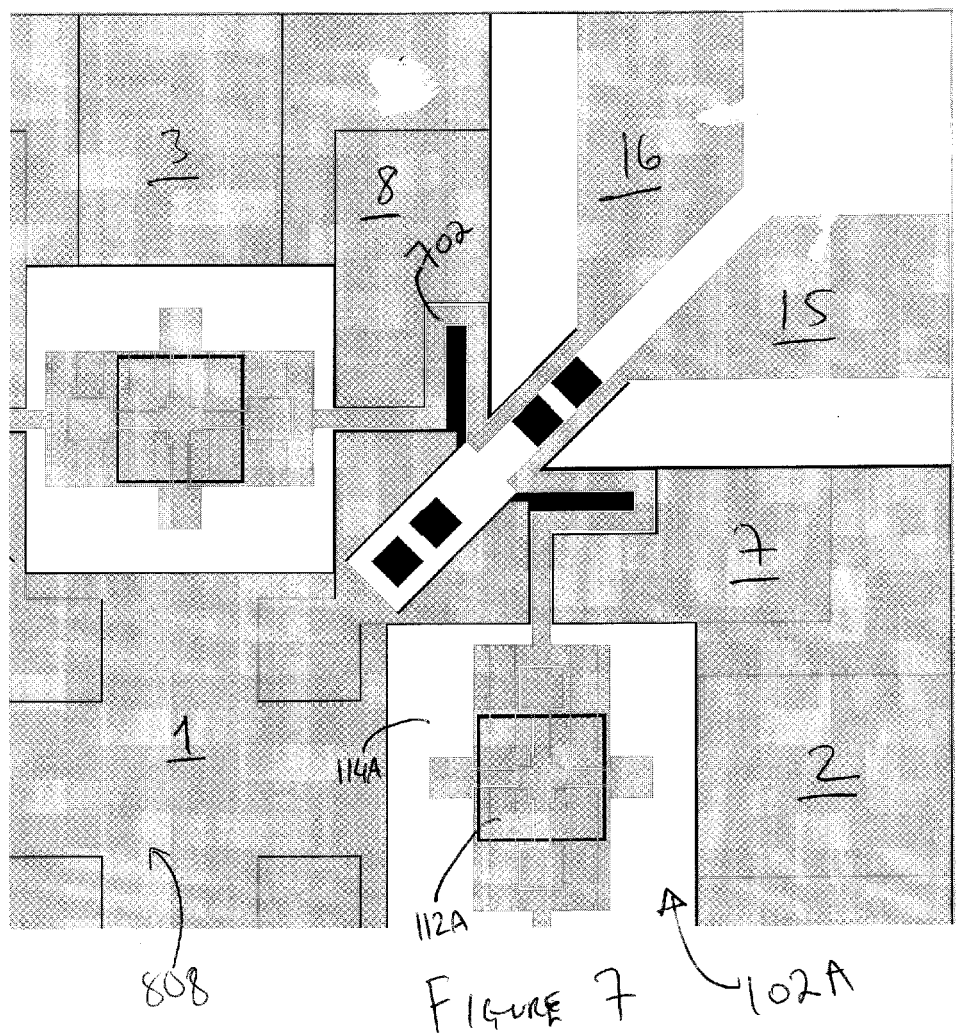
FIG. 7 illustrates a perspective view of the polysilicon routing within the device according to various embodiments of the present disclosure.

Referring now to FIG. 7, a perspective view of the polysilicon routing within the device 100 is shown. The device 100 can be fabricated on a low-resistivity silicon on insulator (SOI) substrate with a 60 μm thick silicon <100> device layer, 2 μm thick buried oxide layer (BOX) and 400-450 μm thick handle layer, according to embodiments of the present disclosure. The structure is released using release holes having a diameter of 4-6 μm. As described above, the inner mass 112 and the outer frame 114 of the proof mass 102 may be connected using the polysilicon tethers 116 that are anchored on the outer frame 114 and the inner mass 112 in a '+' shaped configuration. The sensing portion 116 of the top electrodes are anchored on the outer frame 114 of the proof-mass 102. To isolate the sensing portion 116 from the outer frame 114, a thin layer of silicon nitride 808 may be deposited, as detailed in FIGS. 8A-H and 9. The electrical contact for tapping the sense information from the sensing portion 116 is made by routing a thin layer of polysilicon over the fish hook shaped tether 162 and the ladder-shaped support 164, as can be seen in FIG. 7.

Figure 8A:
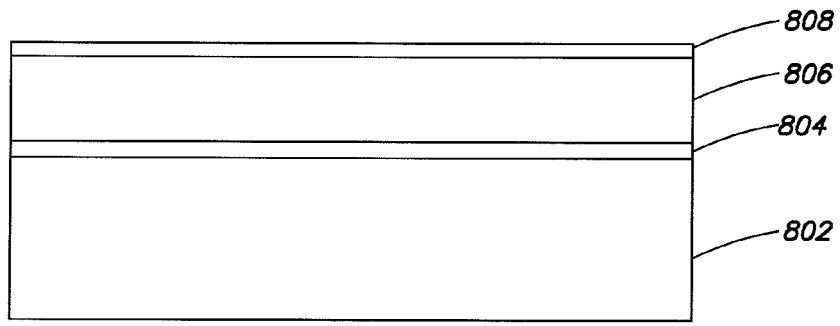
FIGS. 8A-H are visual representations of steps for fabricating the device shown in FIG. 1 according to embodiments of the present disclosure.
Figure 8B:
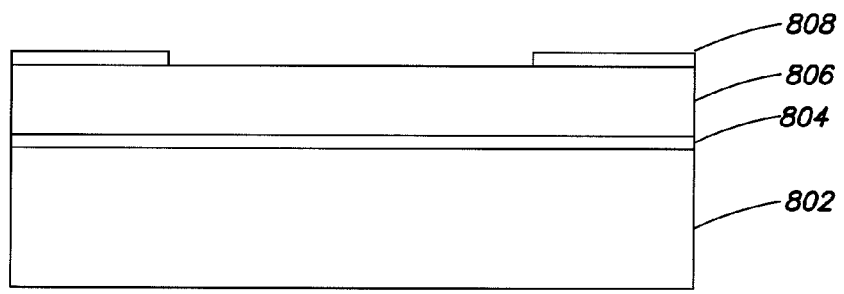
Figure 8C:
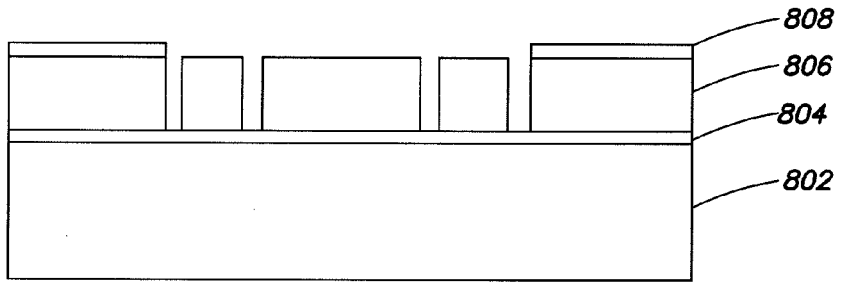
Figure 8D:
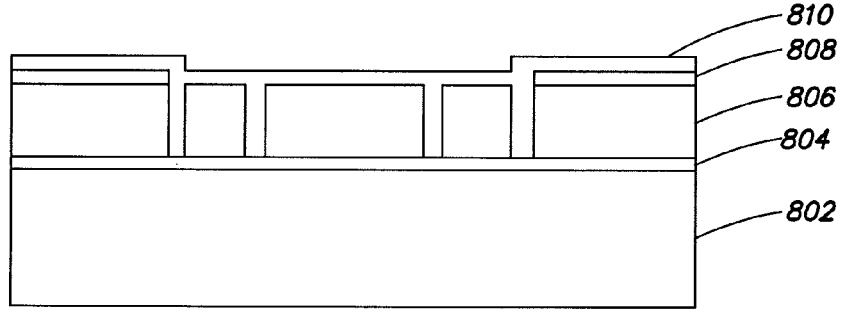
Figure 8E:
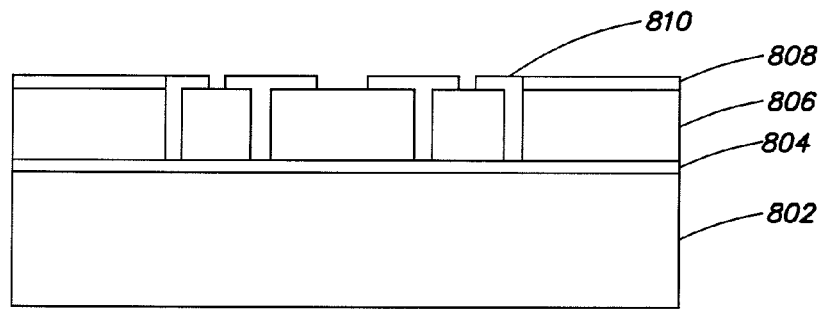
Figure 8F:
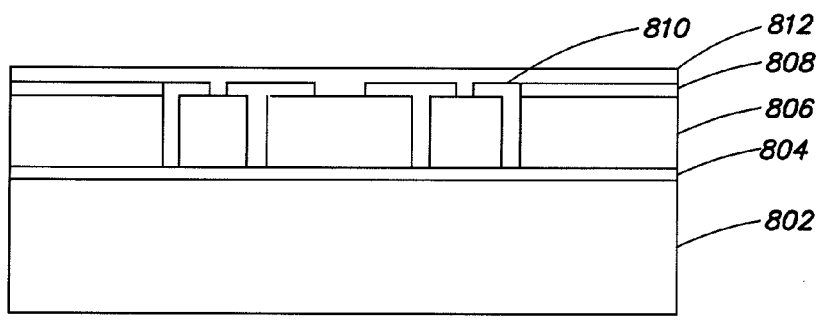
Figure 8G:
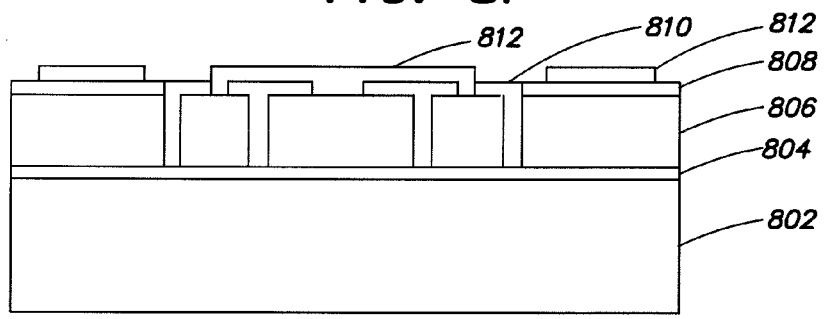
Figure 8H:
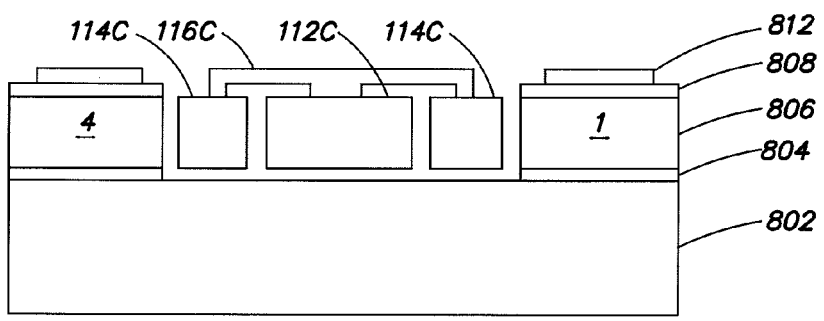

FIGS. 8A-H illustrate visual representations of steps for fabricating the device 100 according to embodiments of the present disclosure. In particular, FIG. 8A shows a nitride layer 808 deposited on the SOI wafer, which consists of a handle layer 802, an oxide layer 804, and a device layer 806. In FIG. 8B, the nitride layer 808 is patterned. In FIG. 8C, the device layer 806 of the SOI wafer is also patterned. In FIG. 8D, a sacrificial oxide layer 810 is deposited on the patterned nitride layer 808 and the patterned device layer 806. In FIG. 8E, the sacrificial oxide layer 810 is patterned. In FIG. 8F, a polysilicon layer 812 is deposited on the sacrificial oxide layer 810. In FIG. 8G, the polysilicon layer 812 is patterned, and in FIG. 8H, the device 100 is released by removing the sacrificial oxide layer 810 and the exposed portion of the oxide layer 804. This may be done by exposing the device 100 to HF. FIG. 8H has also been labeled to correlate to the proof mass 102C. It should be understood that due to the cross-sectional view shown in FIG. 8H, only one pair of side electrodes are shown.

Figure 9:
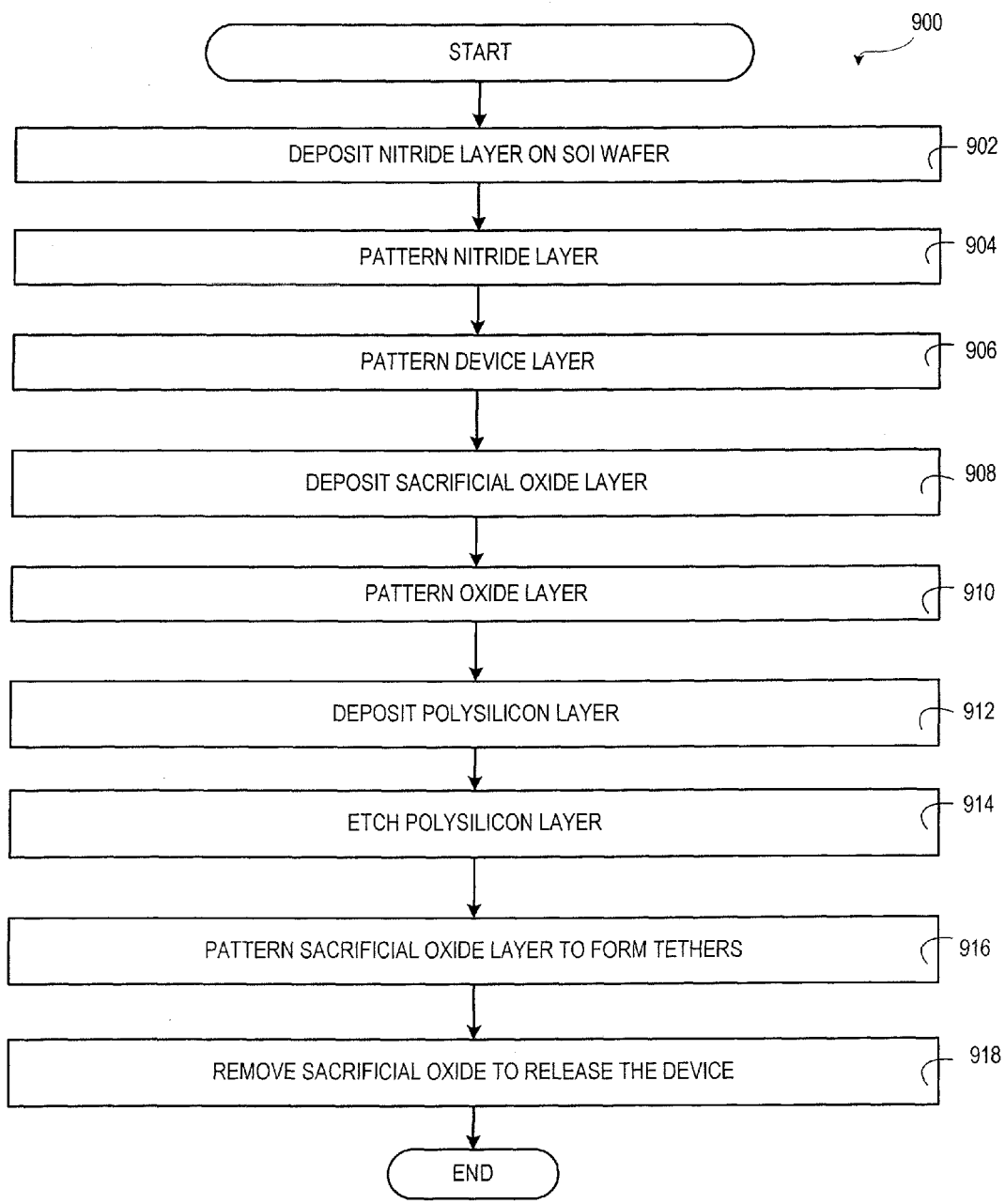
FIG. 9 is a flow diagram illustrating the process of fabricating the device as depicted in FIGS. 8A-H according to various embodiments of the present disclosure.

FIG. 9 is a flow diagram illustrating the process of fabricating the device as depicted in FIGS. 8A-H according to various embodiments of the present disclosure. The routine 900 begins at operation 902, where a nitride layer 808 is deposited on the device layer 806 of the SOI wafer. From operation 902, the routine 900 proceeds to operation 904, where the nitride layer 808 is patterned. From operation 904, the routine 900 proceeds to operation 906, where the device layer 806 of the SOI wafer is also patterned. From operation 906, the routine 900 proceeds to operation 908, where a sacrificial oxide layer 810 is deposited on the patterned nitride layer 808 and the patterned device layer 806. From operation 908, the routine 900 proceeds to operation 910, where the sacrificial oxide layer 810 is patterned. From operation 910, the routine 900 proceeds to operation 912, where a polysilicon layer 812 is deposited on the sacrificial oxide layer 810 on the patterned nitride layer 808 and the patterned device layer 806. From operation 912, the routine 900 proceeds to operation 914, where the polysilicon layer 812 is patterned. From operation 914, the routine 900 proceeds to operation 916, where the device is released by removing the sacrificial oxide layer 810 and the exposed portion of the oxide layer 804, including the oxide layer underneath suspended structure. In various embodiments, this may be done by exposing the device to Hydrofluoric Acid (HF). From operation 916, the routine 900 ends.

The mode for sensing x and y rotation cannot be matched with the drive mode due to the absence of tuning electrodes. Accordingly, tuning electrodes that can match all three modes at drive mode resonance frequency to benefit the Q amplification in sense signal may be included. To improve sensitivity of the structure, the sensing area can be increased by including sense electrodes at the bottom of the inner proof mass 112, which may involve an alternative fabrication process.

Figure 10A:
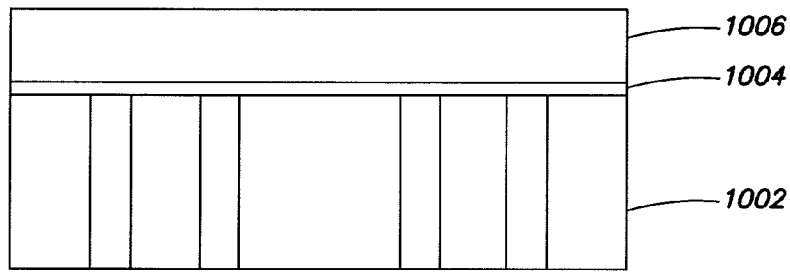
FIGS. 10A-H are visual representations of steps for an alternate process of fabricating the device shown in FIG. 1 according to embodiments of the present disclosure.
Figure 10B:
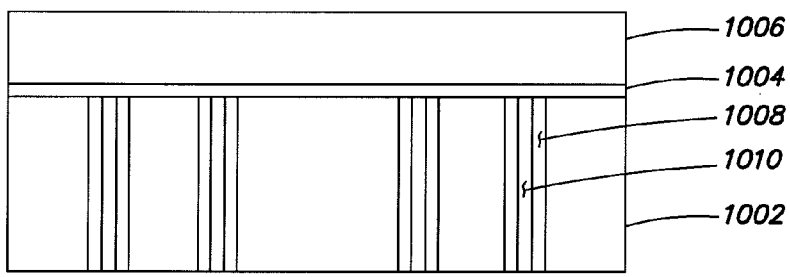
Figure 10C:
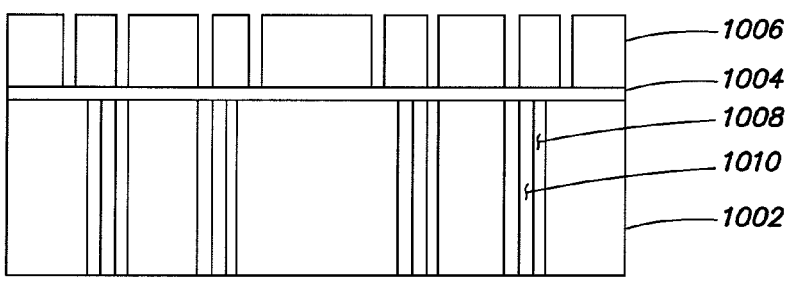
Figure 10D:
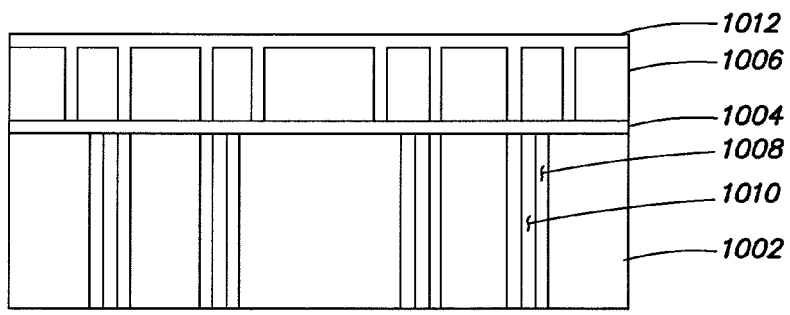
Figure 10E:
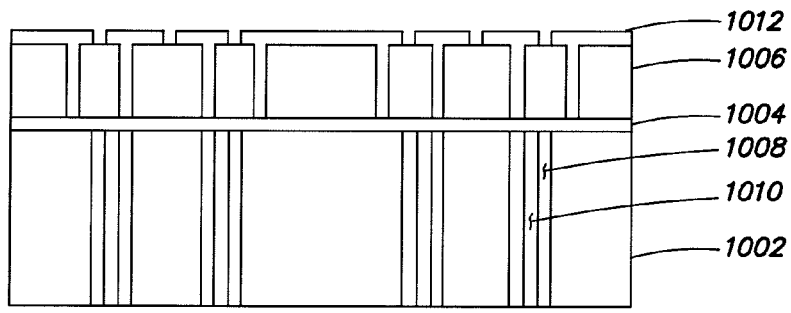
Figure 10F:
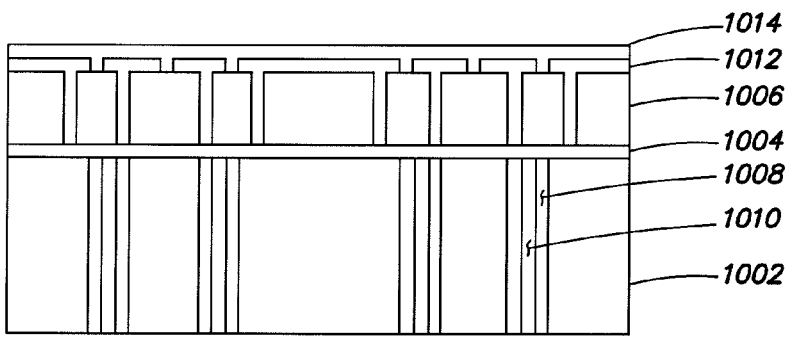
Figure 10G:
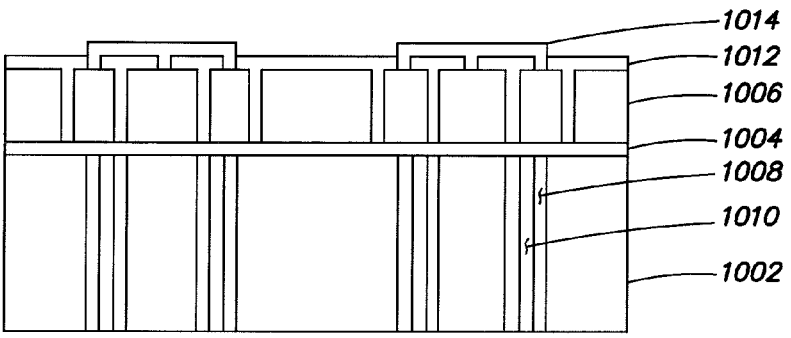
Figure 10H:
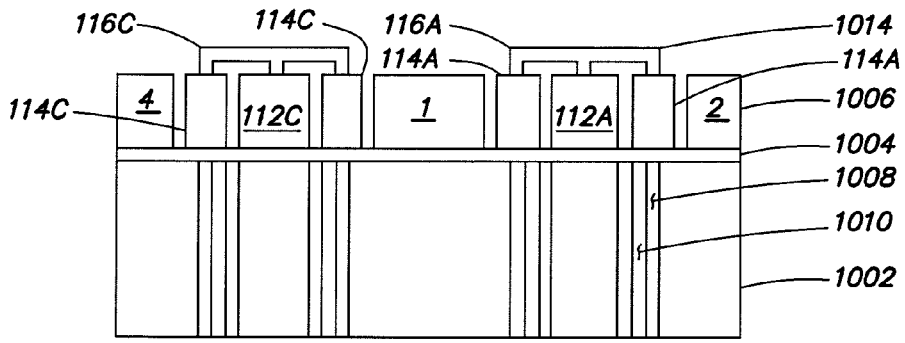

FIGS. 10A-H illustrate visual representations of steps for an alternate process of fabricating the device 100. In FIG. 10A, an SOI wafer comprising a handle layer 1002, an oxide layer 1004, and a device layer 1006 is patterned to form bottom electrodes in the handle layer 1002. In FIG. 10B, the bottom electrodes are isolated from the handle layer 1002 by filling the trenches with an oxide layer 1008 and a polysilicon layer 1010. In FIG. 10C, the device layer 1006 is patterned to form trenches. In FIG. 10D, a sacrificial oxide layer 1012 is deposited on the patterned device layer 1006. In FIG. 10E, the sacrificial oxide layer 1012 is patterned. In FIG. 10F, a polysilicon layer 1014 is deposited on the patterned sacrificial oxide layer 1012. In FIG. 10G, the polysilicon layer 1014 is patterned to form tethers 1062, and in FIG. 10H, the device is released by removing the sacrificial oxide layer 1012. This may be done by exposing the device to HF. FIG. 10H has also been labeled to correlate to the proof mass 102C. It should be understood that due to the cross-sectional view shown in FIG. 10H, only one pair of side electrodes are shown.

Figure 11:
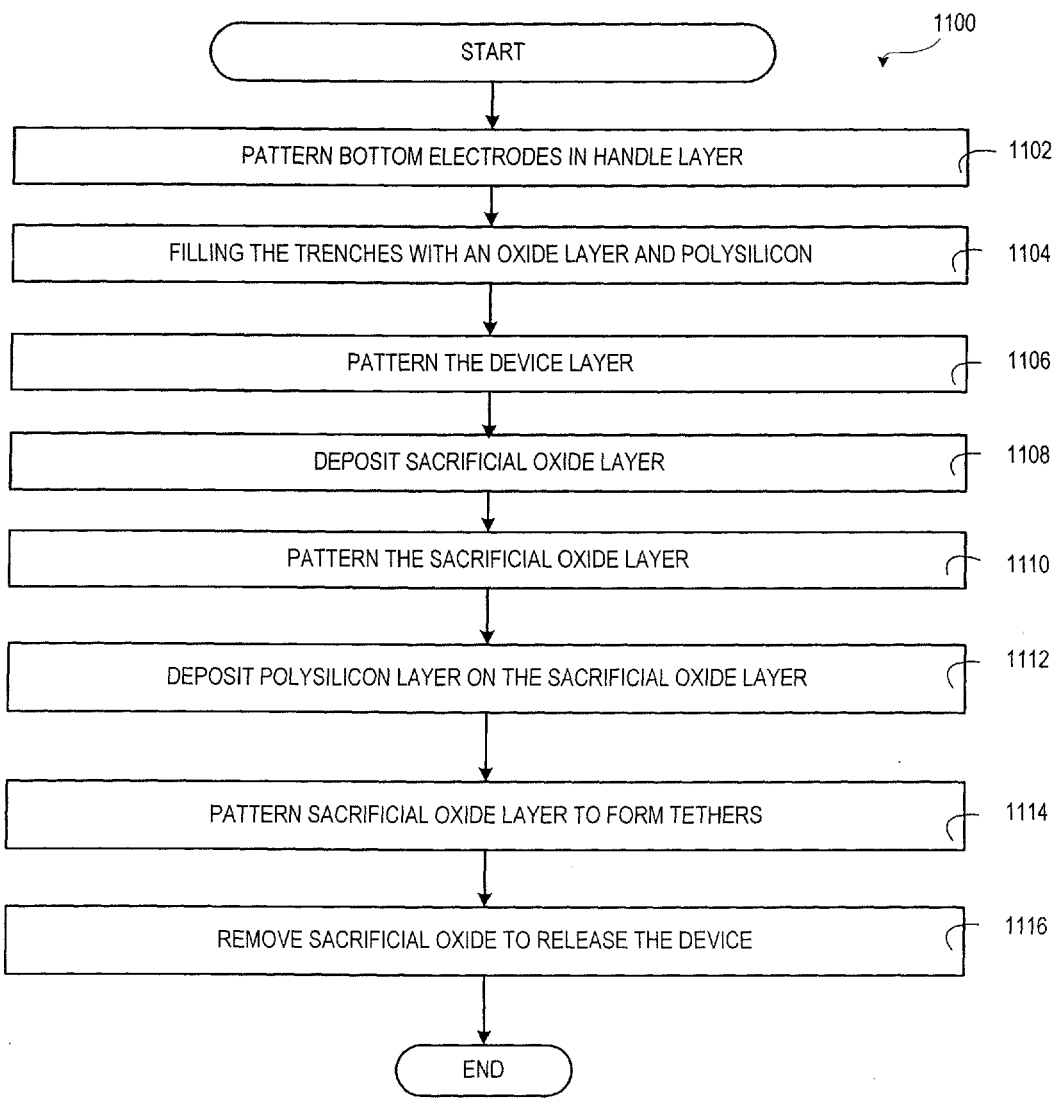
FIG. 11 is a flow diagram illustrating the process of fabricating the device as depicted in FIGS. 10A-H according to various embodiments of the present disclosure.

FIG. 11 is a flow diagram illustrating the process of fabricating the device as depicted in FIGS. 10A-H according to various embodiments of the present disclosure. Routine 1100 begins at operation 1102, where the handle layer 1002 of the device are patterned to form bottom electrodes. From operation 1102, the routine 1100 proceeds to operation 1104, where the bottom electrodes are isolated from the handle layer 1002 by filling the trenches with an oxide layer 1008 and a polysilicon layer 1010. From operation 1104, the routine 1100 proceeds to operation 1106, where the device layer 1006 of the device is patterned. From operation 1106, the routine 1100 proceeds to operation 1108, where a sacrificial oxide layer 1012 is deposited on the patterned device layer 1006. From operation 1108, the routine 1100 proceeds to operation 1110, where the sacrificial oxide layer 1012 is patterned. From operation 1110, the routine 1100 proceeds to operation 1112, where a polysilicon layer 1014 is deposited on the sacrificial oxide layer 1012. From operation 1112, the routine 1100 proceeds to operation 1114, where the polysilicon layer 1014 is patterned to form tethers 1062. From operation 1114, the routine 1100 proceeds to operation 1116, where the device 100 is released by removing the sacrificial oxide layer 1012. From operation 1116, the routine 1100 ends.

According to various embodiments of the present disclosure, a coupled resonator system where the Coriolis Effect acts as a coupling agent between the various drive and sense modes is described. The dynamics of the device 100 can be expressed by a second order differential equation:

$$M\frac{d^2x}{dt^2} + D\frac{dx}{dt} + Kx = F$$

$$D = \frac{\omega M}{Q}$$

$$K = \omega^2 M$$

For drive mode, F is given by, $$F = -V_p v_{drive} \frac{\delta C_{comb-drive}}{\delta x}$$

$$\frac{\delta C_{comb-drive}}{\delta x} = \frac{\varepsilon_0 N h}{g}$$

For sense mode, F is given by, $$F = 2\Omega q_{drive} \omega_{drive}$$

where, $\omega_{drive}$=drive mod e resonant frequency
$V_p$=polarization voltage
$v_{drive}$=drive voltage
N=number of combs
h=height of device layer
g=gap between the combs
$\Omega$=rate of rotation
$q_{drive}$=maximum drive displacement The stiffness can be tuned to the desired value by applying the polarization voltage.

One of the important performance parameters of vibratory gyroscopes is the mechanical quality factor (Q) of its operating modes, which is defined as the ratio of energy stored to energy dissipated. High Q improves sensitivity, rate-resolution and bias drift. Energy dissipation in vibratory designs occurs because of air damping, support loss, surface loss, thermo-elastic damping (TED), and the intrinsic material loss. Hence, the overall mechanical Q for an operating mode can be expressed as $$\frac{1}{Q} = \frac{1}{Q_{Support}} + \frac{1}{Q_{TED}} + \frac{1}{Q_{AirDamping}} + \frac{1}{Q_{Surface}} + \frac{1}{Q_{Intrinsic}}$$

The effect of air damping can be eliminated by operating this device in vacuum, and the contribution of intrinsic material loss for single-crystal-silicon is negligible. Thus, the Q is primarily determined by $Q_{support}$ and $Q_{TED}$, which can be increased by optimizing the dimensions of the resonator.

A detailed finite element analysis simulation of the design can be performed in ANSYS® and CoventorWare® to optimize the dimensions. The sense mode frequency can be designed to be slightly higher than the drive frequency so that sense mode frequency can be electrostatically tuned to match the drive mode frequency.

Figure 12:
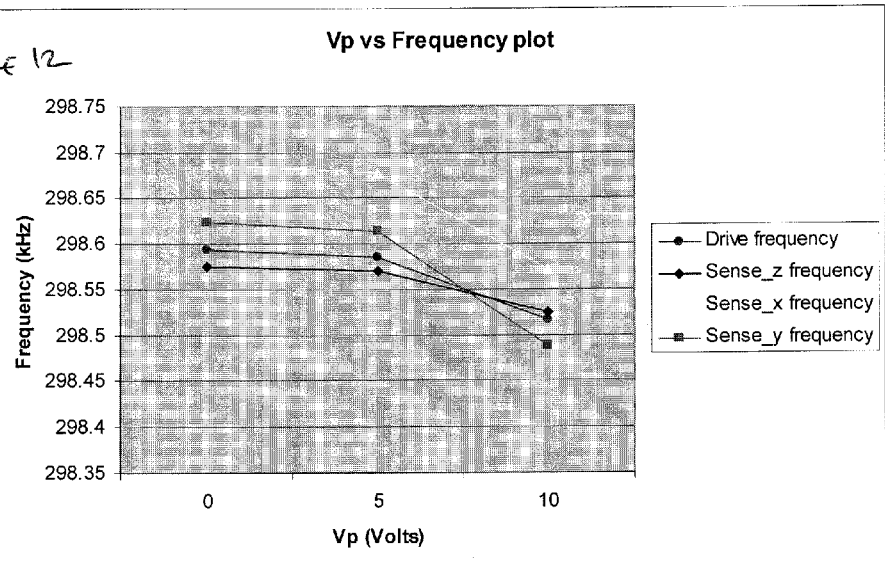
FIG. 12 is a graphical representation illustrating the variation of various mode frequencies with different applied polarization voltages according to various embodiments of the present disclosure.
Figure 13:
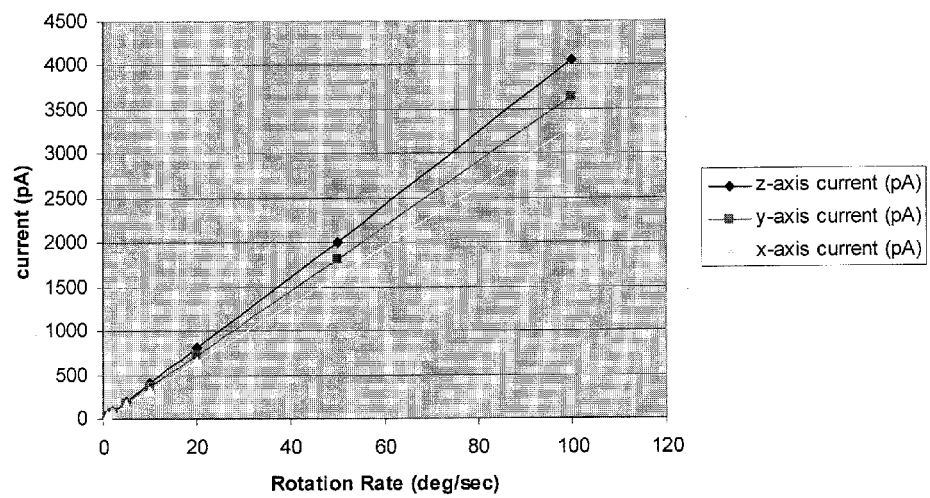
FIG. 13 is a graphical representation illustrating sensitivity of the device for various rotation rates according to various embodiments of the present disclosure.

FIG. 12 is a graphical representation illustrating the variation of various mode frequencies with different applied polarization voltages and FIG. 13 is a graphical representation illustrating sensitivity of the device for various rotation rates according to various embodiments of the present disclosure. In particular, FIG. 13 shows the sensitivity plot of the device 100 for the applied rotation rates in which the applied polarization voltage is 10V and the drive signal has a voltage of 1V.

The present disclosure is illustratively described above in reference to the disclosed embodiments. Various modifications and changes may be made to the disclosed embodiments by persons skilled in the art without departing from the scope of the present disclosure as defined in the appended claims.

What is claimed is:

1. A MEMS device comprising:
   a first proof mass and a second proof mass that can be actuated along a first axis;
   a third proof mass and a fourth proof mass that can be actuated along a second orthogonal axis; and
   a plurality of electrodes capable of sensing at least one rotational motion around at least one of three orthogonal axes, and at least one translational motion along at least one of the three orthogonal axes, wherein the proof masses comprise a corresponding inner mass mechanically coupled to an outer frame via a tether, wherein the tether has a cross-shape proximate a point of attachment to the inner mass.

2. The MEMS device of claim 1, wherein the at least one tether is made from a different structural layer than the inner mass.

3. The MEMS device of claim 1, wherein a thickness of the at least one tether is less than a thickness of the inner mass.

4. The MEMS device of claim 3, wherein the tether is anchored to a top surface of the inner mass.

5. The MEMS device of claim 1, wherein the inner mass is separated from the outer frame by a gap such that the inner mass can move relative to the outer frame.

6. The MEMS device of claim 1, wherein an out-of-plane resonance frequency of the inner mass and the tether attached directly thereto is approximately equal to an in-plane resonance frequency of the first proof mass, such that rotation around a corresponding in-plane axis is sensed at the resonance frequency of the inner mass and the tether attached directly thereto.

7. The MEMS device of claim 1, wherein the outer frame of the first proof mass is tethered to at least two fixed structures.

8. The MEMS device of claim 7, wherein the fixed structures are ladder shaped structures.

9. The MEMS device of claim 1, wherein the plurality of electrodes comprises:
a first x-axis sense electrode separated from a corresponding proof mass along the first axis;
a first y-axis sense electrode separated from the corresponding proof mass along the second axis; and
a first z-axis sense electrode separated from the inner mass of the corresponding proof mass along a third axis.

10. The MEMS device of claim 9, wherein the plurality of electrodes further comprises:
a second x-axis sense electrode separated from the corresponding proof mass along the first axis;
a second y-axis sense electrode separated from the corresponding proof mass along the second axis; and
a second z-axis sense electrode separated from the inner mass of the corresponding proof mass along the third axis.

11. The MEMS device of claim 1 further comprising:
circuitry responsive to signals received from the plurality of electrodes for determining a degree of said at least one rotational motion.

12. The MEMS device of claim 1 further comprising:
circuitry responsive to signals received from the plurality of electrodes for determining a degree of said at least one translational motion.

13. The MEMS device of claim 1, wherein the drive electrode comprises:
a comb drive for driving one or more of the proof masses to resonate at a resonating frequency.

14. A MEMS device comprising:
a first plurality of proof masses that can be actuated along a first axis;
a second plurality of proof masses that can be actuated along a second orthogonal axis; and
a plurality of electrodes capable of sensing at least one of rotational motion around and translational motion along at least one of three orthogonal axes, wherein the proof masses comprise a corresponding inner mass mechanically coupled to an outer frame via a tether, wherein the tether attaches to a center point of one of a top and bottom surface of the inner mass.

15. The MEMS device of claim 14, wherein each of one of the first and second plurality of the proof masses comprises an inner mass mechanically coupled to an outer frame.

16. The MEMS device of claim 15, wherein the inner mass is mechanically coupled to the outer frame via at least one tether.

17. The MEMS device of claim 16, wherein the inner mass is separated from the outer frame by a gap such that the inner mass can move relative to the outer frame.

18. The MEMS device of claim 15, wherein the outer frame of the proof masses are tethered to at least two fixed structures.

19. A MEMS device comprising:
a first plurality of proof masses that can be actuated along a first axis;
a second plurality of proof masses that can be actuated along a second axis orthogonal to the first axis; and
a plurality of electrodes capable of sensing at least one of rotational motion around and translational motion along any of three orthogonal axes wherein the proof masses comprise a corresponding inner mass mechanically coupled to an outer frame via a tether, wherein the tether is made from a different structural layer than any of the proof masses.

* * * * *